United States Patent Office 2,893,886
Patented July 7, 1959

2,893,886

IRON BLUE PIGMENT COMPOSITION AND PROCESS FOR ITS MANUFACTURE

Archibald M. Erskine, Berkeley, and Richard M. Lydon, Richmond, Calif., assignors to The California Ink Company, Inc., San Francisco, Calif., a corporation of Delaware No Drawing. Application September 24, 1957
Serial No. 685,804

8 Claims. (Cl. 106—272)

This invention relates to a pigment composition ideally suited for incorporation in inks used in the manufacture of transfer or carbon paper. More particularly, it relates to a pigment composition comprising iron blue pigment, oil, wax, and a surface active agent.

Iron blue has long been used as an ingredient of blue transfer inks, such as typewriter carbons and pencil carbons, together with one or more waxes and one or more non-drying oils. Great difficulty has been encountered, however, in obtaining a satisfactory degree of dispersion of the iron blue pigment upon grinding the dry pigment into the wax-oil vehicle that is used in the preparation of carbon paper inks. The basic reason for this difficulty is the strong tendency of iron blue pigment particles to aggregate when they are dried thereby forming hard agglomerates which are not reduced by grinding to the original primary pigment particles.

Attempts have been made to improve the dispersion properties of iron blue for this use by employing various water-soluble wetting and dispersing agents with the dry pigment; or by transferring the original primary pigment from its water wet form into oil by a process known as "flushing" in which added oil preferentially wets the pigment and displaces water. However, none of these methods has given a completely satisfactory solution to the problem. For example, pigment compositions made by "flushing" the original water wet iron blue pigment with oil contain a large amount of oil because of the quantity of oil required to separate substantially all of the water from the iron blue. The resultant pigment composition of iron blue and oil is a very viscous oily mixture which is difficult to remove completely from shipping containers. Furthermore, such compositions which contain large amounts of oil tend to limit the carbon ink manufacturer in the formulation of carbon paper inks that incorporate small quantities of oil.

Another type of "flushed" product has been made in the form of substantially dry lumps, comprising iron blue and oil, by separating the oil-pigment mixture from the water by filter pressing, and finally drying at elevated temperatures. However, the resultant dry lumps of iron blue and oil require excessive amounts of milling to obtain satisfactory dispersion and they show very little improvement over similar compositions made from dry pigments.

The pigment composition of this invention overcomes the deficiencies described above and is characterized by containing a flushed iron blue pigment which is completely dispersed in a colloidal condition in a solid mixture of oil and wax components. It has dry, non-adhering properties and contains a minimum of oil. This pigment composition, furthermore, requires a minimum of energy for dispersion in the carbon paper manufacturer's finished ink.

Summarizing this invention, the wet iron blue pigment particles are treated with an oil soluble, water insoluble surface active agent selected from the group consisting of long chain alkyl oxazolines and imidazolines, and a non-drying oil. This treatment results in a rapid formation of oil globules containing dispersed iron blue which settle out of the water, thereby assisting separation of the water from the mixture of pigment, oil and surface active agent. After water is separated from the composition, molten wax is added to produce a flowable mixture which solidifies upon cooling to form the pigment composition hereof in which the iron blue is dispersed in the mixture of oil, surface active agent and wax. The pigment composition is particularly useful in the form of flakes that are readily dispersed by the user for making transfer inks.

In greater detail the iron blue pigment is utilized in accordance with the present invention before it has dried and agglomerated. Iron blue is available commercially, or it is readily prepared in a conventional manner by reacting ferrous sulfate with sodium ferrocyanide in an acid aqueous medium and in the presence of ammonium sulfate. The reaction produces a white precipitate of ferrous ammonium ferrocyanide, which is then oxidized by an oxidizing agent such as sodium chlorate or sodium bichromate. Oxidation converts the white precipitate to iron blue, or in other words ferric ammonium ferrocyanide, which is then filtered.

For best results, the precipitated and oxidized iron blue slurry, preferably after a brief washing by any suitable means, is placed in a vat fitted with agitators, and then a non-drying oil, in which has been dissolved a small amount of the oil soluble surface active agent hereof is added to the vat. Upon agitation of the mixture, iron blue pigment is coated by, or transferred into, the solution of surfactant in oil, and characteristic flocculated particles are formed which settle rapidly in the aqueous medium and greatly facilitate subsequent washing steps.

If desired, the pigment slurry may be first treated with a small amount of a water soluble naphthenate soap, such as sodium or ammonium naphthenate before the surface active agent and non-drying oil are added. This treatment gives a coating or intimate mixture of naphthenic acid with the pigment under the high acidity conditions of the slurry. The combined treatments, or the surfactant-oil treatment alone, have the effect of converting the pigment surface from a hydrophilic to a strongly hydrophobic condition.

After the treated slurry has been further washed with water and the excess water removed by decantation, the slurry is filter-pressed and given additional washing with water in the press until it is substantially free of mineral acids, generally above pH 3. The presence of substantial quantities of acid at this point is undesirable because it makes flushing more difficult.

The washed press cake, which has a firm consistency and contains from approximately 40 to 60 percent solids, is transferred to a kneading or flushing machine of the dough mixer type, and additional non-drying oil is added to flush the pigment. Successive increments of non-drying oil are added accompanied by mechanical kneading to provide separation of the water as a clear liquid phase from the mixture of iron blue, non-drying oil and surface active agent. Preferably the water phase is removed after each addition of non-drying oil by pouring it off in the usual manner.

In this preferred procedure, generally about 25 to 75 percent of the total non-drying oil is added in the vat together with the surface active agent, and the remaining 75 to 25 percent of the oil is added in the kneading or flushing machine after the final aqueous washing step in order to flush the pigment oil mixture and separate water from the mixture. Optimum results have been obtained when about 40 percent of the total oil is added with the surfactant, and about 60 percent added in the flushing step. The reason for obtaining best results by adding part of the drying oil and surface active agent in the vat before completing the washing and decantation is that the flocculated particles of pigment, oil and surface active agent initially formed are easier to wash and provide a firmer press cake than is obtained when washing is completed before the non-drying oil is added.

Also, if desired, a flushing agent is used during the flushing step, since such agents substantially accelerate the flushing process. Suitable flushing agents are well known. Generally cationic type flushing agents are used for iron blue.

After completion of the flushing, as indicated by formation of a coherent and viscous pigment-oil phase, the small amount of residual water is removed by application of heat and vacuum in the flushing machine. During this step, the composition becomes extremely viscous and the maximum shearing action produced by the mixing blades is obtained, with the result that an extremely high degree of pigment dispersion is obtained. Water is removed from the composition in order to avoid having emulsifying conditions present when the wax is added, since water would then be a part of the pigment composition and produce undesirable properties in the final coating.

As previously described, treatment of iron blue with the oil solution of surface active agent in the vat before the iron blue has been completely washed is preferred, since the treatment provides rapidly settling flocculated particles that are readily washed acid-free. However, if desired, the surface active agent and oil may be added to the pigment press cake in the kneading or flushing machine in conjunction with the flushing step after the iron blue has been completely washed. In this method, the iron blue becomes incorporated with the surfactant and its oil solvent prior to or in the early stages of flushing. Addition of more oil and flushing agents, as in the procedure described above, then results in a flushed oil phase containing pigment, surfactant, and oil, the water being separated by decantation and subsequent evaporation in the same manner as above. Furthermore, in this procedure in which the iron blue is washed acid-free before addition of the surface active agent, the surface active agent may be separately added first, followed by addition of the non-drying oil.

Whichever manner of iron blue treatment and flushing is used, a molten hard wax, such as carnauba, is next slowly added to the hot viscous mass. The fluid molten wax reduces the viscosity of the pigment-surfactant-oil composition markedly, and thereby produces a flowable mixture as long as the mixture remains hot. The function of the wax in the final pigment composition is to contribute hardness and oil retentiveness.

The hot, fluid iron blue-surfactant-oil-wax pigment composition is finally poured into pans or molds. On cooling, the composition hardens and may be broken up into lumps of varying sizes or used in the forms obtained from the molds. It has been found that the flowable, hot molten composition may be flaked by running it over a rotating chilled roll and removing the dry flakes by a scraping blade. The flaked product may be prepared in this or any conventional manner by applying the molten composition to a cool surface thereby forming a solid thin film, and then breaking up the film into flakes.

Oil soluble, water insoluble, and heat stable surface active agents or surfactants that are employed to form the pigment-oil globules in accordance with this invention are selected from the group consisting of long chain alkyl oxazolines and imidazolines, and such compounds are commercially available. The oxazolines and imidazolines that have the following general structure provide superior results in forming flocculated globules of iron blue, non-drying oil and surface active agent:

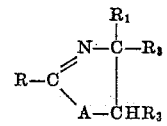

in which formula R is selected from the group consisting of saturated and unsaturated straight chain alkyl groups containing from 7 to 19 carbon atoms; A is selected from the group consisting of oxygen and $NR_4$ in which N is nitrogen; and $R_1$, $R_2$, $R_3$, and $R_4$ are selected from the group consisting of hydrogen, alkyl groups containing from 1 to 3 carbon atoms, and hydroxy alkyl groups containing from 1 to 3 carbon atoms.

Oxazolines corresponding to the above general structure are made by the condensation of saturated or unsaturated fatty acids containing 8 to 20 carbon atoms with beta amino alcohols, diols or triols, such as 2-amino 2-methyl 1-propanol, 2-amino 2-ethyl 1,3-propane diol or tris (hydroxy methyl) amino methane. For example, condensation of oleic acid with 2-amino 2-ethyl 1,3-propane diol gives an oxazoline surfactant with the following structure:

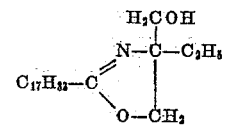

Simple long chain alkyl imidazolines in which the —NH-group is unsubstituted, as disclosed in U.S. Patents 2,155,877–8 and 2,215,861–4, are made by condensing saturated or unsaturated fatty acids containing 8 to 20 carbon atoms, or their esters, anhydrides, amides or acyl halides, with ethylene diamine and its hydrochloride.

Substituted long chain alkyl imidazolines are described as those containing alkyl or hydroxy alkyl side chains. They are made by the condensation of saturated or unsaturated fatty acids containing 8 to 20 carbon atoms, or their esters or amides, with hydroxy alkyl alkylene polyamines, such as hydroxy ethyl ethylene diamine and hydroxy ethyl diethylene triamine, in accordance with the disclosure in U.S. Patents 2,267,965 and 2,268,273. If oleic acid and betahydroxy ethyl ethylene diamine, alternatively designated as 2-amino ethyl ethanolamine, are used, the imidazoline obtained by elimination of two mols of water has the structure

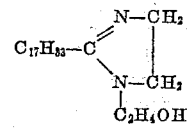

Compounds of these two types show strong surface active properties in the non-aqueous solvents in which they are soluble, such as, mineral oils, vegetable oils, kerosene, benzene, carbon tetrachloride, esters, ketones, and alcohols. It has been found that oxazolines and imidazolines strongly modify the properties of their non-aqueous solvents in such a way as to give a large increase in retention of the solvent or oil by the iron blue pigment when the latter is treated with such non-aqueous solutions, and that these oil soluble surface active agents are unique in this respect. Water soluble surface active agents are unsatisfactory since they tend to form emulsions which obviate satisfactory removal of water by flushing.

Also, long chain oxazolines and imidazolines, suitable for this invention, are characterized by excellent heat stability, as indicated by the fact that they may be distilled in a vacuum above 200° C., or held at 300° C. in an inert atmosphere for several hours, without decomposition. This heat stability property is important since the mixture of iron blue, surface active agent and non-drying oil is generally heated to eliminate traces of water remaining after the flushing is completed. Furthermore, heat stability is necessary to withstand the high temperature at which carbon paper coating equipment may be operated.

In addition these oil soluble surfactants are instrumental in producing the solid colloidal dispersion of iron blue in the final product hereof. As a result of such dispersion, the pigment compositions of this invention are exceptionally easy to disperse in carbon paper ink formulations to give non-settling compositions.

Any of the well known non-drying oils compatible with the surface active agent and iron blue may be used as the oil component of our composition. Mineral oil of the light lubricating oil type, such as a pale oil with 200 second viscosity at 100° F. (Saybolt), is preferred for best results. Other suitable oils include vegetable oils, such as coconut oil.

Flushing agents may, if desired, be employed in the flushing step in a well known manner to increase the rate of flushing the iron blue pigment. Such agents include cationic higher molecular weight amines, amine salts and quaternary ammonium salts, such as dodecylamine, octadecylamine acetate, di-isobutyl phenoxy ethoxy ethyl dimethyl benzyl ammonium chloride, and cetyl trimethyl ammonium bromide.

Waxes which are suitable for preparation of the pigment composition hereof have melting points not less than 65° C. and are compatible with the non-drying oils used. Carnauba is the preferred wax because of its high melting point, hardness and oil retentiveness, which serve to produce desirable brittleness and non-stickiness in the final composition. However, examples of other waxes that may be employed are sugar cane, montan, candelilla, and microcrystalline waxes.

More than one wax and more than one oil may be used, if desired, for slight modifications of physical properties of the product. Combinations of oil soluble oxazoline and imidazoline surfactants may also be incorporated with the oil in the preparation of the pigment-oil composition.

The general composition of our iron blue-surfactant-oil-wax product is about as follows:

|  | Percent by weight |
|---|---|
| Iron blue pigment (solids) | 60–80 |
| Oil soluble surfactant | 1–5 |
| Oil (total) | 10–20 |
| Wax | 5–20 |

Although a suitable pigment composition may be prepared with variations of one or two percent in the above range of proportions, optimum results are obtained within the range specified. If the pigment solids are below about 60 percent the product will be deficient in tinctorial strength. On the other hand if the amount of pigment solids is above about 80 percent the composition tends to be too difficult to handle due to an excessively high viscosity. Furthermore, with pigment compositions containing more than 80 percent iron blue, the pigment-oil mass tends to disintegrate in the flushing stage because of the deficiency in the amount of vehicle. This disintegration shows itself in the development of a dry color appearance in place of the coherent dispersion of pigment in oil. Also, the surface active agent range represents the optimum for such surface active compounds based on the surface area of the iron blue pigment and the requirement of providing the desired flocculation effect in which oil globules containing dispersed iron blue pigment settle out of the water.

As to the range of non-drying oil, the amount of oil must be sufficient to carry the dispersed pigment in an enveloping oil phase. Ten percent of oil is usually sufficient to envelope the pigment and prevent the mass from disintegrating at the drying stage in the flushing process, as previously described. The oil should not exceed about 20 percent of the total composition, or else the product will be oily and sticky in nature. Such products are difficult to handle and can not readily be transferred from containers.

The range of wax content varies somewhat depending upon the type of wax employed. The minimum is based upon the amount just sufficient to lower the viscosity of the flushed pigment in oil after the drying step in the flushing machine. The maximum 20 percent figure is not critical and may be exceeded without substantial harm to the properties of the pigment composition.

A typical pigment composition hereof has the following composition:

|  | Percent |
|---|---|
| Iron blue pigment | 72.5 |
| Oxazoline surfactant | 2.5 |
| Mineral oil (total) | 16 |
| Carnauba wax | 7.5 |
| Flushing agent | 1.5 |

This product may be described as a hard, dry colloidal dispersion of iron blue pigment in a matrix comprising non-drying oil, wax and a small proportion of oil soluble surfactant of the long chain oxazoline or imidazoline type. Whether in lump or flake form, the product is non-sticky and may be fractured, the flake form being brittle.

The finished lumps or flakes appear homogeneous and uniform in composition to the eye. No phase separations occur when the hot, flowable composition is cooled to a lump or flake form. In the cooled, dry form, therefore, the product appears to contain the pigment in a substantially colloidally dispersed condition in the oil-wax vehicle.

The colloidal condition resulting from the presence of the oil-soluble surfactant hereof is further indicated by the remarkable self-dispersing properties of the product in hot mineral oil. Tests have shown that such a dispersion, prepared by shaking one part of the product in one part of hot oil, gives a practically permanent, non-settling suspension of the pigment. The iron blue pigment composition hereof, because of the properties described above, gives practically the maximum tinctorial strength possible with iron blue pigment.

The dry iron blue-surfactant-oil-wax product made by the described process, either in lump or flake form, shows outstanding advantages over iron blue pigment compositions of the prior art used for carbon paper. Compared to iron blue pigment itself in powder form, the pigment composition hereof is exceptionally easy to disperse in carbon paper ink formulations, giving not only very large cost savings over the usual grinding procedures but greater tinctorial strength per unit weight of pigment.

Compared to flushed products containing high proportions of oil, this pigment composition is markedly superior in completely eliminating the sticking to the walls of storage and shipping containers with the attendant difficulties in removal of the composition. The low oil content of the composition hereof, moreover, is a distinct advantage in giving the carbon paper manufacturer more latitude in making ink formulations for coating the paper.

Furthermore, the pigment composition is also superior to prior art flushed products of the dry lump type, comprising pigment and oil, in respect to the greater ease of dispersion in carbon paper ink formulations. The resulting savings in time and grinding costs by the use of the pigment-surfactant-oil-wax lumps or flakes hereof are outstanding.

Also, the flake form has substantial practical advantages over the lump form of the same composition in its greater ease of handling and more rapid dispersion in hot waxes and oils in the carbon paper manufacturer's plant.

The principal use of the composition of this invention is that of a raw material for the manufacture of carbon paper inks, in which extremely easy dispersion is obtained, together with the optimum tinctorial value from the colloidally dispersed iron blue pigment. Other uses for which the product is suitable are: (1) in the coloring of candles, (2) coloring of wax crayons.

As an example of one method of using the pigment composition in the manufacture of a carbon paper, the lump or flake composition is added to a steam-jacketed mixer, such as a ball mill, and to it are added petrolatum, paraffin wax and other hard waxes, such as additional carnauba or montan wax. After the mixing is completed and all the material is melted, the thin, fluid composition, so-called "dope" is coated, while hot, on to a suitable paper tissue by a coating machine, following the usual procedures of this industry. After chilling, the coated paper is ready for use. Normally, carbon paper ink, or dope, contains approximately 20 percent iron blue pigment, so that the composition hereof would comprise slightly less than 30 percent of the carbon paper manufacturer's final ink composition.

Using a typical carbon paper ink formulation, comparative tests have shown that inks prepared from the composition of this invention give a transfer paper which produces a greater number of legible copies than a corresponding paper made from inks using other forms of iron blue pigment.

The following are typical examples of the preparation of the pigment compositions hereof:

Example 1

To a settled iron blue suspension (7.8% solids) containing 1320 lbs. pigment, from which one wash water had been removed by decantation, there was added with mild agitation a solution of 43.5 lbs. of oxazoline surfactant,, comprising the condensation product from oleic acid and 2-amino 2-methyl 1,3-propane diol (sold commercially by Commercial Solvents Corporation as Alkaterge C), dissolved in 146.5 lbs. of mineral oil (200 second viscosity at 100° F., Saybolt). The iron blue pigment in the aqueous suspension adsorbed the oil solution of the surfactant and formed a well-flocculated precipitate which settled rapidly when the agitation was stopped. Two additional washings by decantation were made, after which the slurry was filtered and washing continued in the filter press until the filtrate was substantially free of mineral acid.

A duplicate batch of oxazoline-oil treated pigment was then made. From these two batches, 4473 lbs. of washed press cake containing 1946 lbs. pigment, 217 lbs. mineral oil and 64.5 lbs. oxazoline surfactant, was taken for the flushing operation. This was carried out with four successive portions of the press cake as follows: 1066 lbs. was added to the flushing machine and kneaded during successive additions of 60 and 20 lbs. of mineral oil and two 5 lb. portions of cetyl trimethyl ammonium bromide as a flushing agent. The water phase which separated in this step was poured out of the machine.

Another portion of press cake amounting to 1146 lbs. was added to the first flushed material in the machine and kneading continued with further addition of 60 lbs. of the mineral oil and 15 lbs. of the same flushing agent. The flushed water phase was removed as before.

Leaving the pigment-oil phase in the machine, a third and fourth portion of pigment pulp (1178 and 1083 lbs.) were flushed with addition of 60 and 40 lbs. of oil, respectively, and removal of water from each flushing. In the third flushing 10 lbs. of flushing agent was used but none was required in the fourth flushing. The total oil added in the flushing steps was therefore 240 lbs. and the total flushing agent 35 lbs.

After the fourth flushing and removal of the water phase, the cover of the machine was closed and vacuum applied to it, with heating by steam in the jacket, the kneading being continued during this step. This operation reduced the water content of the composition to a negligible amount, the mass becoming at the same time extremely viscous and tough.

The machine was then opened and, while still hot and with the mixing blades running, 200 lbs. of melted carnauba wax was added very slowly. A marked reduction in viscosity was obtained, giving a flowable, although still heavy paste composition. This paste was then run on to a chilled roll flaking machine which gave a flake form to the cooled product. Adjustment of the mechanical conditions in this operation could produce either sheets, ribbons or flakes. The cooled product in any of these forms was smooth and shiny in appearance, dry and non-sticky to the touch, and broke down on slight rubbing to very small flakes.

The composition of the product was: Pigment 72.0%, oxazoline surfactant 2.4%, oil 16.9%, wax 7.4% and flushing agent 1.3%.

The product, made as described above, or allowed to cool and broken into lump form, was characterized by having very high pigment color strength and extremely easy dispersibility in hot waxes or oils due to the colloidal condition of the pigment in the iron blue-surfactant-oil-wax system.

Example 2

This example illustrates the alternative procedure of treating the pigment in the form of press cake or aqueous pulp in the flushing machine with an oxazoline surfactant dissolved in oil after it has been washed substantially free of mineral acids to a pH of 3–4 instead of treatment in slurry form in the vat.

376 oz. of iron blue press cake (146.5 oz. dry weight) washed acid-free was mixed in a small flushing machine (dough mixer) with 4.8 oz. of the oxazoline surfactant used in Example 1, dissolved in 13.7 oz. of mineral oil. After blending in this manner, approximately one-half of the material (200 oz.) was removed and the balance (194.5 oz.) remaining in the machine was flushed by adding 13.5 oz. of additional oil and 1.75 oz. of cetyl trimethyl ammonium bromide flushing agent, the separated water being poured off.

The remaining treated pulp was flushed by returning it in three successive portions (72, 72 and 56 oz.) to the machine. No additional oil or flushing agent was used with the first portion. To the second portion, 2.75 oz. of oil and 0.25 oz. of the same flushing agent were added, and to the third, 2.5 oz. oil and 0.75 oz. agent were added. The separated water was removed after each of these additional flushings in the usual manner.

The pigment-oil phase was then dried by removing the residual moisture under vacuum and heat. To the dry, viscous mass 14.5 oz. of melted carnauba wax was slowly added and the kneading continued until the viscous mass was uniform in composition.

The product was then cooled in the flushing machine, after which it was broken into lumps which showed excellent tinctorial strength and dispersion in hot mineral oil. Its properties were the same as those of the product of Example 1, except for the flake form. The composition was: Pigment 72.9%, oxazoline surfactant 2.4%, oil 16.1%, wax 7.2% and flushing agent 1.4%.

Example 3

This example follows the alternative procedure used in Example 2, but employs a long chain imidazoline as the oil soluble surfactant.

376 oz. of iron blue press cake (146.5 oz. dry weight) after thorough washing was mixed in a small flushing machine with 4.8 oz. of an oil soluble imidazoline surfactant, comprising the condensation product from oleic acid and 2-amino ethyl ethanolamine (sold commercially by Geigy & Company as Alro Amine O), dissolved in 13.7 oz. mineral oil. After good blending, 200 oz. of the mixture was removed and the balance in the machine was flushed by adding 13.5 oz. of additional oil. Rapid flushing occurred, the pigment-oil phase being in the form of small flushed granules. The water phase was removed by allowing these granules to settle several times and removing the supernatant water.

The remaining treated pulp was flushed by returning it in three successive portions (72, 72 and 56 oz.) to the machine. To these were added, respectively, 1.5 oz., 2.75 oz. and 2.25 oz. of oil and the kneading and separation of water were carried out with each portion. The exceptional effectiveness of the imidazoline surfactant in enhancing transfer of pigment to the oil phase is illustrated in this case by the fact that no flushing agent was required.

The residual moisture was removed by vacuum drying and heat. To the dry viscous mass 14.5 oz. of melted carnauba wax was slowly added and the kneading continued until the mass was uniform in composition. The hot mass was then flaked by flowing it on to the back rolls of a three-roll mill cooled by running cold water through the rolls.

The product was similar in physical appearance and brittleness to the flakes produced in Example 1. It had the same excellent tinctorial strength and dispersion properties as the latter. Its composition was: Pigment 73.4%, imidazoline surfactant 2.4%, oil 16.9% and wax 7.3%.

We claim:
1. The method of preparing a solid homogeneous pigment composition which comprises adding an oil soluble surface active agent selected from the group consisting of long chain alkyl oxazolines and long chain alkyl imidazolines to water wet iron blue, flushing water from said iron blue and surface active agent by including mineral oil which preferentially wets the pigment to provide a separate phase of an oil-surface active agent-iron blue mixture and displaces the water, separating the water from the oil-surface active agent-iron blue mixture, and mixing a molten wax having a melting point above 65° C. with said oil-surface active agent-iron blue mixture, said wax being selected from the group consisting of carnauba, sugar cane, montan, candelilla, and microcrystalline waxes, and the relative amounts of said iron blue, mineral oil, surface active agent and wax ingredients employed in said method based on the total weight of said ingredients being from about 60 to 80 percent by weight of said iron blue, from about 10 to 20 percent by weight of said mineral oil, from about 1 to 5 percent by weight of said surface active agent, and at least about 5 percent by weight of said wax.

2. The method of claim 1 in which said pigment composition is distributed on a surface in the form of a thin film, and converted into the form of solid flakes after it has cooled and solidified by scraping said composition from said surface.

3. The method of preparing a solid homogeneous pigment composition which comprises providing a solution of from about 1 to 5 percent by weight based on the weight of the pigment composition of an oil soluble surface active agent selected from the group consisting of long chain alkyl oxazolines and long chain alkyl imidazolines dissolved in mineral oil, mixing said solution with about 60 to 80 percent by weight of water wet iron blue based on the weight of iron blue solids in said pigment composition to form a flocculated oil-surface active agent-iron blue mixture, flushing water from said mixture by adding mineral oil which preferentially wets the mixture and becomes part of the pigment-oil phase thereby displacing the water, separating the water from said oil-surface active agent-iron blue mixture, intermixing from about 5 to 20 percent by weight of molten wax having a melting point above 65° C. with said mixture, and adjusting the temperature below the melting point of said wax to form said solid pigment composition, said wax being selected from the group consisting of carnauba, sugar cane, montan, candelilla, and microcrystalline waxes, and the relative amounts of said iron blue, mineral oil, surface active agent and wax ingredients employed in said method based on the total weight of said ingredients being from about 60 to 80 percent by weight of said iron blue, from about 10 to 20 percent by weight of said mineral oil, from about 1 to 5 percent by weight of said surface active agent, and at least about 5 percent by weight of said wax.

4. The method of preparing a solid homogeneous pigment composition which comprises mixing with water wet iron blue a solution of mineral oil and a surface active agent having the formula

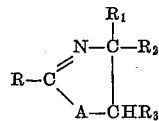

in which R is selected from the group consisting of saturated and unsaturated straight chain alkyl groups containing from seven to nineteen carbon atoms; A is selected from the group consisting of oxygen and $NR_4$ in which N is nitrogen; and $R_1$, $R_2$, $R_3$, and $R_4$ are selected from the group consisting of hydrogen, alkyl groups containing from 1 to 3 carbon atoms, and hydroxy alkyl groups containing from 1 to 3 carbon atoms to precipitate flocculated particles of an oil-surface active agent-iron blue mixture, washing said mixture with water until it is substantially free of mineral acids, intermixing increments of additional mineral oil with said mixture to flush water therefrom until the total of mineral oil is between about 10 to 20 percent by weight of the pigment composition, decanting water separated from said mixture by said mineral oil, removing substantially all remaining water from said oil-surface active agent-iron blue mixture by evaporating the remaining water present in said mixture, intermixing a molten wax having a melting point above 65° C. to said mixture, and adjusting the temperature of said mixture below the melting point of said wax to form said solid pigment composition, said wax being selected from the group consisting of carnauba, sugar cane, montan, candelilla, and microcrystalline waxes, and the relative amounts of said iron blue, mineral oil, surface active agent and wax ingredients employed in said method based on the total weight of said ingredients being from about 60 to 80 percent by weight of said iron blue, from about 10 to 20 percent by weight of said mineral oil, from about 1 to 5 percent by weight of said surface active agent, and at least about 5 percent by weight of said wax.

5. The method of claim 4 in which from 25 to 75 percent of the total amount of said mineral oil is added together with said surface active agent and from 75 percent to 25 percent of said mineral oil is added for flushing said mixture.

6. Iron blue intimately mixed with a composition that provides with said iron blue a solid, homogeneous mixture having the properties of high pigment strength and ready dispersibility in oil and molten wax vehicles, said composition consisting essentially of mineral oil; a water insoluble surface active agent selected from the group consisting of long chain alkyl oxazolines and long chain alkyl imidazolines; and a wax having a melting point above 65° C. and selected from the group consisting of carnauba, sugar cane, montan, candelilla, and microcrystalline waxes; said solid homogeneous iron blue mixture containing from about 60 to 80 percent by weight of said iron blue, from about 10 to 20 percent by weight of said mineral oil, from about 1 to 5 percent by weight of said surface active agent, and at least about 5 percent by weight of said wax.

7. Iron blue intimately mixed with a composition that provides with said iron blue a solid, homogeneous mixture having the properties of high pigment strength and ready dispersibility in oil and molten wax vehicles; said composition consisting essentially of mineral oil; a water insoluble, oil soluble surface active agent having the structural formula

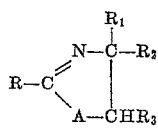

in which R is selected from the group consisting of saturated and unsaturated straight chain alkyl groups containing from 7 to 19 carbon atoms, A is selected from the group consisting of oxygen and $NR_4$ in which N is nitrogen, and $R_1$, $R_2$, $R_3$, and $R_4$ are selected from the group consisting of hydrogen, alkyl groups containing from 1 to 3 carbon atoms, and hydroxy alkyl groups containing from 1 to 3 carbon atoms; and a wax having a melting point above 65° C. and selected from the group consisting of carnauba, sugar cane, montan, candelilla, and microcrystalline waxes; said solid homogeneous iron blue mixture containing from about 60 to 80 percent by weight of said iron blue, from about 10 to 20 percent by weight of said mineral oil, from about 1 to 5 percent by weight of said surface active agent, and at least about 5 percent by weight of said wax.

8. The solid homogeneous iron blue mixture of claim 7 in which said mixture is in the form of flakes.

References Cited in the file of this patent
UNITED STATES PATENTS

| | | |
|---|---|---|
| 2,130,560 | Plechner et al. | Sept. 20, 1938 |
| 2,392,658 | Goepfert | Jan. 8, 1946 |
| 2,598,332 | Walton | May 27, 1952 |
| 2,644,760 | Schroeder | July 7, 1953 |
| 2,669,546 | Zussman et al. | Feb. 16, 1954 |
| 2,820,043 | Rainey et al. | Jan. 14, 1958 |